US008632645B2

(12) United States Patent
Daitou et al.

(10) Patent No.: US 8,632,645 B2
(45) Date of Patent: Jan. 21, 2014

(54) MANUFACTURING METHOD AND MANUFACTURING APPARATUS OF INSULATION CAP

(75) Inventors: Kouji Daitou, Makinohara (JP); Yasusada Oishi, Makinohara (JP); Yusuke Sano, Susono (JP)

(73) Assignee: Yazaki Corporation, Tokyo (JP)

( * ) Notice: Subject to any disclaimer, the term of this patent is extended or adjusted under 35 U.S.C. 154(b) by 405 days.

(21) Appl. No.: 13/133,846

(22) PCT Filed: Dec. 25, 2009

(86) PCT No.: PCT/JP2009/071909
§ 371 (c)(1),
(2), (4) Date: Jun. 9, 2011

(87) PCT Pub. No.: WO2010/074348
PCT Pub. Date: Jul. 1, 2010

(65) Prior Publication Data
US 2011/0240202 A1    Oct. 6, 2011

(30) Foreign Application Priority Data

Dec. 26, 2008 (JP) .................................. 2008-333721
Apr. 27, 2009 (JP) .................................. 2009-108152

(51) Int. Cl.
*B32B 37/00*    (2006.01)
(52) U.S. Cl.
USPC ............ 156/64; 156/73.1; 156/250; 156/358; 156/498; 156/510; 156/580.1
(58) Field of Classification Search
USPC .......... 156/64, 73.1, 250, 267, 358, 498, 510, 156/580.1, 580.2
See application file for complete search history.

(56) References Cited

U.S. PATENT DOCUMENTS 3,303,243 A    2/1967   Hughes et al.
4,780,163 A *  10/1988  Haneline et al. ................ 156/94

(Continued)

FOREIGN PATENT DOCUMENTS

| CA | 838850 A | 4/1970 |
| CN | 1483601 A | 3/2004 |
| CN | 1668449 A | 9/2005 |
| JP | 2008-086169 A | 4/2008 |

OTHER PUBLICATIONS

Communication dated Mar. 14, 2013 from the State Intellectual Property Office of P.R. China in a counterpart application No. 200980152849.8.

(Continued)

*Primary Examiner* — James Sells
(74) *Attorney, Agent, or Firm* — Sughrue Mion, PLLC

(57) ABSTRACT

A manufacturing method of an insulation cap, includes the steps of: supplying an elongated tube from a tube supplying unit to a tube placing table; moving a tube press-fastening portion and a welding body portion towards the tube placing table so as to press-fasten a press-fastening position of the tube placed on the tube placing table and to press-contact a press-contacting position of the tube placed on the tube placing table; performing a welding process with respect to the press-contacting position of the tube; moving the tube placing table during the welding process to feed the tube in a tube feeding direction by a specified amount; blanking the tube subjected to the welding process after feeding the tube to form the insulation cap; and discharging the formed insulation cap from a blanking position.

12 Claims, 10 Drawing Sheets

(56) References Cited

U.S. PATENT DOCUMENTS

| | | | |
|---|---|---|---|
| 5,634,672 A * | 6/1997 | Stack et al. | 285/54 |
| 7,371,305 B2 | 5/2008 | Sano et al. | |
| 7,469,934 B2 | 12/2008 | Inaba et al. | |
| 7,964,048 B2 * | 6/2011 | Hlavinka et al. | 156/158 |
| 2004/0036277 A1 | 2/2004 | Inba et al. | |
| 2006/0054275 A1 | 3/2006 | Sano et al. | |

OTHER PUBLICATIONS

International Search Report for PCT/JP2009/071909 dated Apr. 20, 2010 [PCT/ISA/210].

* cited by examiner

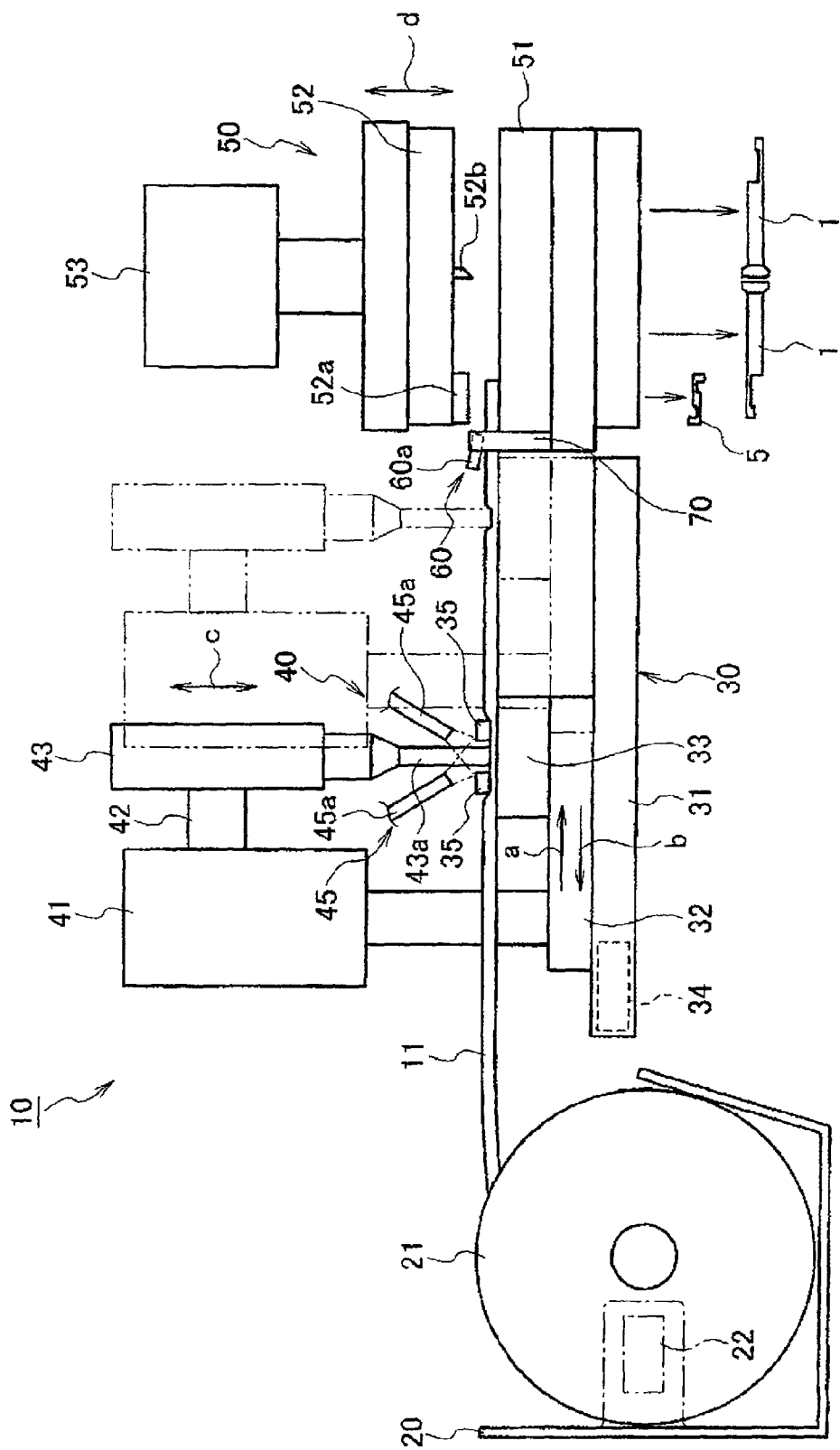

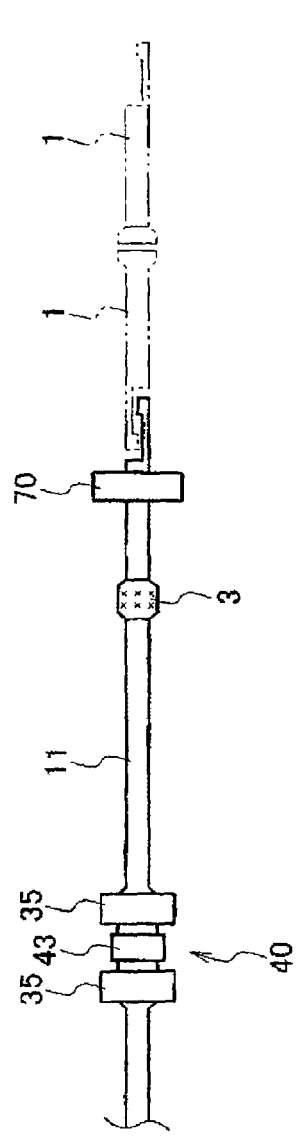
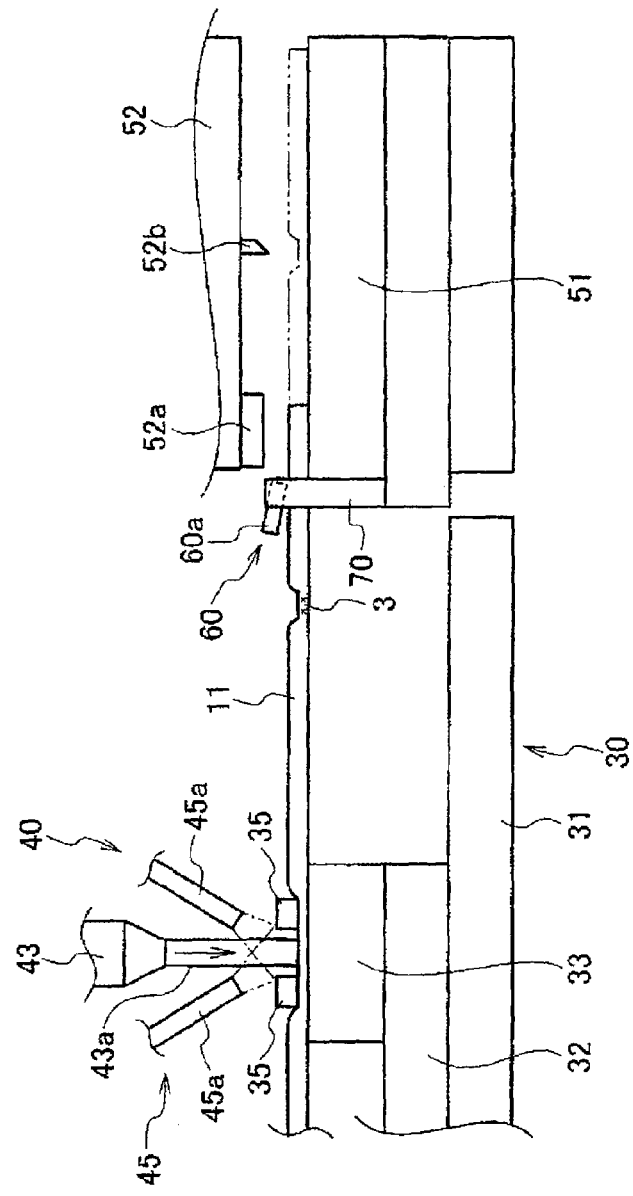
FIG.4A
FIG.4B

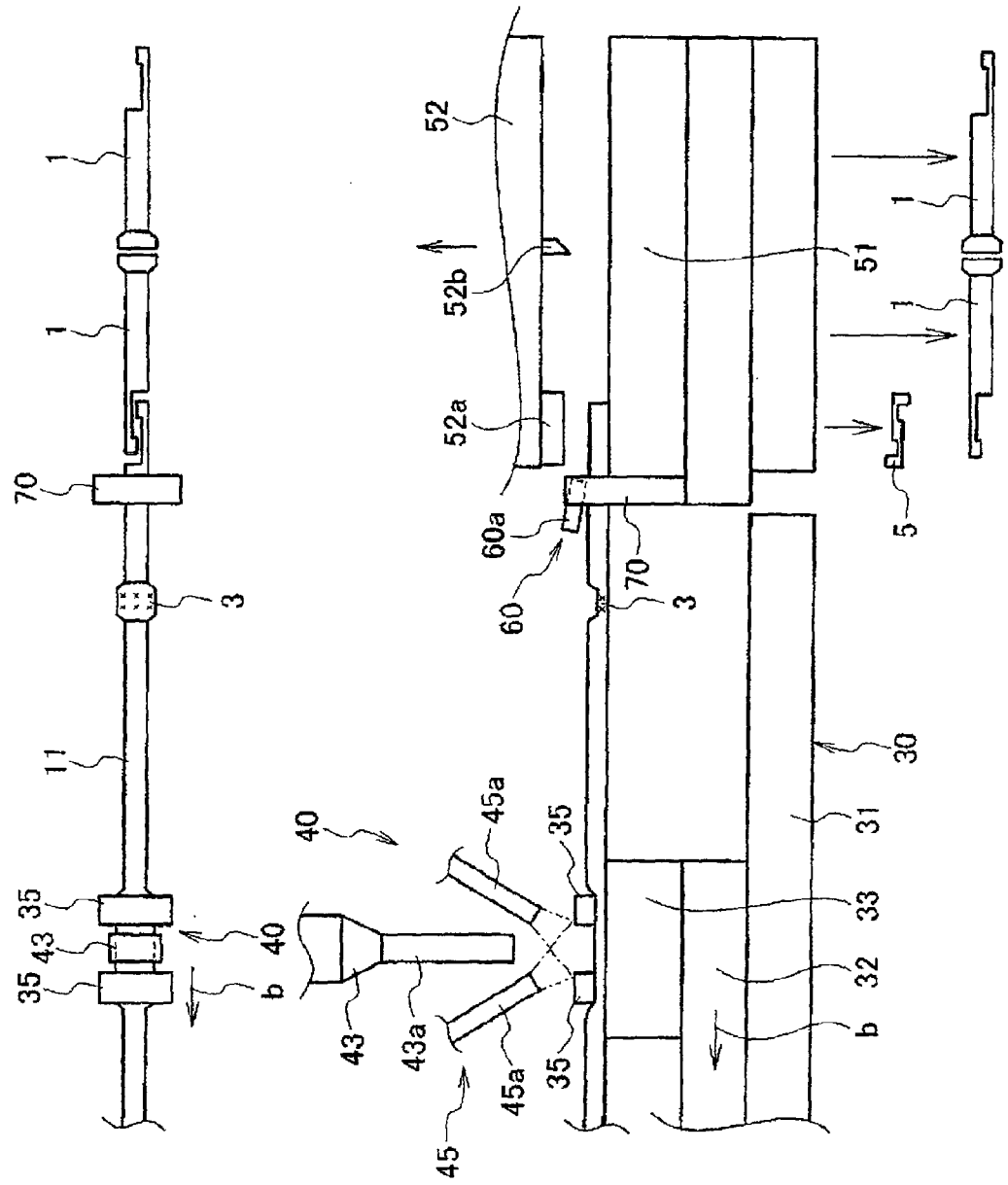

MANUFACTURING METHOD AND MANUFACTURING APPARATUS OF INSULATION CAP

TECHNICAL FIELD

The present invention relates to a manufacturing apparatus and a manufacturing method for manufacturing insulation caps from a long tube.

BACKGROUND ART

When insulation caps are molded from synthetic resin materials by an injection molding machine, since injection molds have to be changed for materials and sizes of insulation caps to be molded, this approach using the injection molding machine is not suitable for multi-kind, small-lot production. Then, the applicant of the present patent application proposed an insulation cap manufacturing apparatus described in PTL 1.

The insulation cap manufacturing apparatus 100 includes, as is shown in FIG. 10, first to third tube feeding units 102, 103, 104 which are disposed on a base 101 at intervals in a tube transport direction 'A', a tube welding unit 105 disposed directly downstream of the first tube feeding unit 102 on the base 101, and a cap blanking unit 106 disposed between the second and third tube feeding units 103, 104 on the base 101.

The first to third tube feeding units 102, 103, 104 have pairs of upper and lower rollers 102a, 102b, 103a, 103b, 104a, 104b, respectively, and a long tube 110 is disposed between the pairs of upper and lower rollers 102a, 102b, 103a, 103b, 104a, 104b. The long tube 110 is transported by a specified amount every time the pairs of upper and lower rollers 102a, 102b, 103a, 103b, 104a, 104b are rotated.

The tube welding unit 105 has a pair of upper and lower welding portions 105a, 105b and performs a welding operation on the tube 110 held by the rollers.

The tube blanking unit 106 has a lower receiving table 106a, an upper blanking portion 106b and a cutting portion 106c. The tube blanking unit 106 blanks an insulation cap 109 (shown in FIG. 11) out of the tube 110.

Next, the operation of the manufacturing apparatus 100 will be described. When the long tube 110 is fed out by a specified amount by the first to third tube feeding units 102, 103, 104, the transport of the tube 110 is stopped in a specified position. Next, in the tube welding unit 105, the upper welding portion 105a is lowered to a position where the upper welding portions 105a is brought into press contact with the lower welding portion 105b, so as to perform a welding operation on the tube 110.

In the tube blanking unit 106, the upper blanking portion 106b and the cutting portion 106c are lowered towards the lower receiving table 106a at the same time as the welding operation is performed on the tube 110, so as to perform a blanking operation on the tube 110. As is shown in FIG. 11, two insulation caps 109 are produced through a single blanking step.

When the tube welding operation and the insulation cap blanking operation are completed, the manufacturing flow proceeds to the tube feeding step by the tube feeding units 102, 103, 104. Insulation caps 109 are manufactured continuously by repeating sequentially the operations.

CITATION LIST

Patent Literature

[PTL 1] JP-A-2008-86169

SUMMARY OF INVENTION

Technical Problem

However, in the manufacturing apparatus 100 for insulation caps 109, the respective tube feeding units 102, 103, 104 transport the tube 110 by virtue of friction forces produced through rotation of the pairs of rollers 102a, 102b, 103a, 103b, 104a, 104b thereof. Consequently, for transporting tubes 110 of different sizes, since preparation work is necessary which includes replacement of tube feeding units 102, 103, 104 or changing gap dimensions between the pairs of rollers 102a, 102b, 103a, 103b, 104a, 104b to deal with sizes of tubes to be used, the working efficiency is deteriorated, leading to a problem that the working time becomes long. There is another problem that a tube is bent in the tube feeding step.

Further, the tube cannot be fed while the tube welding step is being carried out. Moreover, the tube feeding step and the tube welding step are both the steps requiring some time to have the steps completed, and since the time consuming steps are carried out separately, there is caused a problem that the working time becomes long.

Solution to Problem

Then, the invention has been made with a view to solving these problems, and an object thereof is to provide a manufacturing apparatus and a manufacturing method of insulation caps which can realize a reduction in working time.

In order to achieve the object, there is provided a manufacturing method of an insulation cap, including: a supplying step of supplying an elongated tube from a tube supplying unit to a tube placing table; a press-fastening and press-contacting step of moving a tube press-fastening portion and a welding body portion towards the tube placing table so as to press-fasten a press-fastening position of the tube placed on the tube placing table and to press-contact a press-contacting position of the tube placed on the tube placing table; a welding step of performing a welding process with respect to the press-contacting position of the tube; a feeding step of moving the tube placing table during the welding step to feed the tube in a tube feeding direction by a specified amount; a blanking step of blanking the tube subjected to the welding process after the feeding step to form the insulation cap; and a discharging step of discharging the formed insulation cap from a blanking position.

The manufacturing method may include a reading step of reading production instruction information indicated on a tube cassette which is housed in the tube supplying unit and winds the tube therein.

In the manufacturing method, the insulation cap may be discharged by air blow in the discharging step.

In the manufacturing method, the welding process may be performed by an ultrasonic welding in the welding step, and cooling air may blow against the welding body portion at all times.

In the manufacturing method, the tube placing table may be provided with a tube insertion guide.

In the manufacturing method, a press fastening force and a press contacting force may be checked by a pressure sensor in the press-fastening and press-contacting step.

Moreover, there is provided a manufacturing apparatus of an insulation cap, including: a tube supply unit which supplies an elongated tube; a tube placing table for placing thereon the tube supplied from the tube supply unit; a tube press-fastening portion which moves together with the tube placing table in a tube feeding direction and moves towards the tube placing table so as to press-fasten a press-fastening position of the tube placed on the tube placing table; a welding body portion which moves together with the tube press-fastening portion towards the tube placing table so as to press-contact a press-contacting position of the tube placed on the tube placing table and to perform a welding process with respect to the press-contacting position of the tube; a tube feeding unit which moves the tube placing table during the welding process to feed the tube in the tube feeding direction by a specified amount; and a cap blanking unit which blanks the tube subjected to the welding process which is fed from the tube feeding unit to form the insulation cap and discharges the formed insulation cap.

The manufacturing apparatus, may further include: a tube cassette which is housed in the tube supplying unit and winds the tube therein; and a reading unit which reads production instruction information indicated on the tube cassette.

In the manufacturing apparatus, the cap blanking unit may include a cap discharge unit which discharges the insulation cap by air blow.

In the manufacturing apparatus, the welding body portion may be an ultrasonic welding portion for performing an ultrasonic welding process with respect to the press-contacting position of the tube. Further, the manufacturing apparatus may have a cooling air blow device which blows cooling air against the ultrasonic welding portion at all times.

In the manufacturing apparatus, the tube placing table may be provided with a tube insertion guide.

In the manufacturing apparatus, a pressure sensor may be provided in each of the tube press-fastening portion and the welding body portion to check a press fastening force and a press contacting force.

According to the invention, the tube press fastening portion of the tube feeding unit and the welding main body portion move together in the direction in which the former press and the latter welds the tube on the tube placing table, or in the direction in which the press fastening by the former and the press contact by the latter to the tube are released. Thus, since both the tube press fastening portion and the welding main body portion are shifted to positions where to press fasten and press contact a tube of any size, respectively, the preparation work becomes unnecessary which would otherwise have to be carried out to deal with a change in tube size. In addition, since the tube feeding work can be carried out while the tube welding work is being carried out, the time consuming tube welding step and tube feeding step can be carried out concurrently as much as possible.

In addition, since the automatic setup switching is carried out based on the production instruction information in the manufacturing apparatus of insulation caps, the preparation time can be reduced.

Further, since when insulation caps are manufactured by blanking, the insulation caps so manufactured and the like are discharged from the blanking position by air from the blower, not only can the manufacturing work be automated, but also the working time can be reduced.

Furthermore, since the horn of the ultrasonic welding unit is cooled by air from the blower at all times, the welding stability can be increased, as a result of which the reduction in working time can be realized.

Moreover, since the pressure sensor is provided in each of the tube press fastening portion and the welding body portion, it can be checked how much force is applied by the press fastening portion and the welding body portion. Therefore, the change in size of tube can be easily detected by measuring the variation in pressure.

BRIEF DESCRIPTION OF DRAWINGS

FIGS. 1A to 1C show an embodiment of the invention, of which FIG. 1A is a front view of an insulation cap, FIG. 1B is a sectional view taken along the line A-A in FIG. 1A, and FIG. 1C is a front view showing a state in which a conductive connecting portion is covered by an insulation cap.

FIG. 2 is a schematic block diagram of an insulation cap manufacturing apparatus according to the embodiment of the invention.

FIGS. 3A and 3B show the embodiment of the invention, of which FIG. 3A shows a state in which a tube of a large size is pressed by a tube press fastening portion, and FIG. 3B shows a state in which a tube of a small size is pressed by the tube press fastening portion.

FIGS. 4A and 4B show the embodiment of the invention, of which FIG. 4A is a schematic plan view showing a state in which a horn of an ultrasonic welding unit is lowered, and FIG. 4B is a schematic side view showing the state.

FIGS. 5A and 5B show the embodiment of the invention, of which FIG. 5A is a schematic plan view showing a state in which the tube is transported by a specified amount during an ultrasonic welding step, and FIG. 5B is a schematic side view showing the state.

FIGS. 6A and 6B show the embodiment of the invention, of which FIG. 6A is a schematic plan view showing a state in which the horn of the ultrasonic welding unit is raised, and a blanking portion and a cutting portion are lowered, and FIG. 6B is a schematic side view showing the state.

FIGS. 7A and 7B show the embodiment of the invention, of which FIG. 7A is a schematic plan view showing a state in which a tube placing table returns to an initial position, and the blanking portion and the cutting portion are raised, and FIG. 7B is a schematic side view showing the state.

DESCRIPTION OF EMBODIMENTS

[Embodiment]

Hereinafter, an embodiment of the invention will be described based on the drawings. FIGS. 1A to 9 show the embodiment of the invention.

Figure 1A:
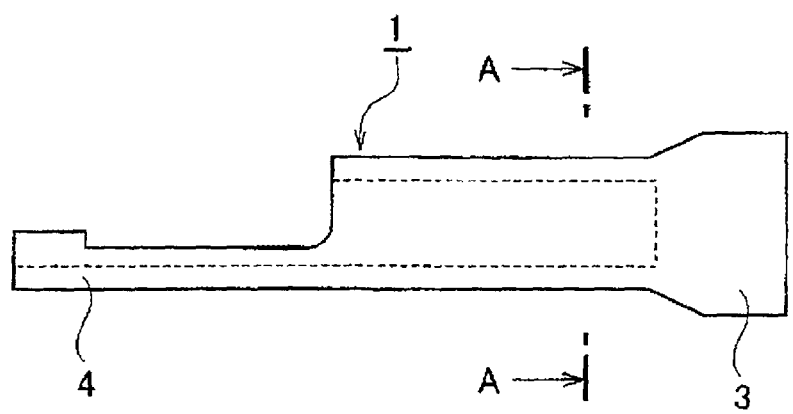
Figure 1B:
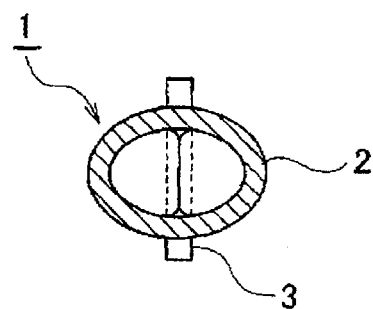
Figure 1C:
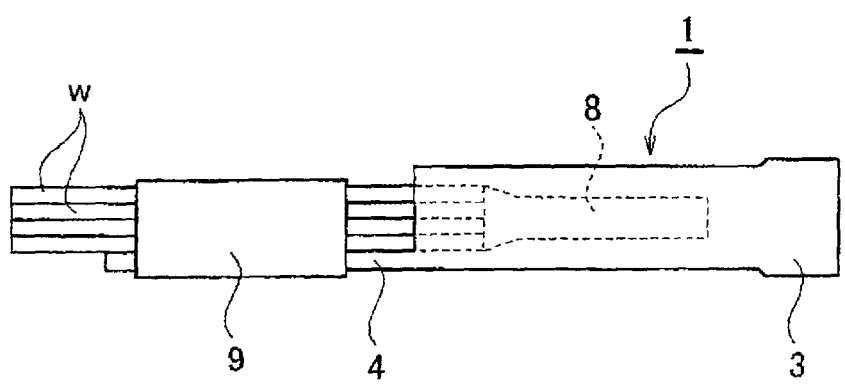

As is shown in FIGS. 1A, 1B, an insulation cap 1 is formed of a tube 11 in which one end side is formed into a sealed portion 3 by a welding operation and the other end is formed into a tongue piece portion 4 by blanking. The tube 11 is formed into a cylindrical shape having a circular or elliptical cross-section 2 from an insulation material such as vinyl chloride, polypropylene (PP), elastomer or the like, and the insulation cap 1 is manufactured by use of the tube 11 so formed. As is shown in FIG. 1C, the insulation cap 1 covers a conductive connecting portion 8 where a plurality of electric wires W, which are electrically connected, are connected together and the electric wires W which are so covered at the conductive connecting portion 8 are fixed together at a portion where the tongue piece portion 4 is formed by use of a restraining tape 9. The insulation tube 1 is used to protect the conductive connecting portion 8 where the plurality of electric wires W are connected together in the way described above.

Next, a manufacturing apparatus 10 of insulation caps 1 will be described. As is shown in FIG. 2, the manufacturing apparatus 10 of insulation caps includes a tube supply unit 33 for feeding out a long tube 11, a tube feeding unit 30 having a tube placing table 33 on which a tube 11 fed out from the tube supplying unit 20 is placed and moving the tube placing table 33 in a feeding direction 'a' of the tube 11 and a reverse direction 'b' to the tube feeding direction 'a', a tube welding unit 40 for performing a welding operation on the tube placing table 33, a cap blanking unit 50 for performing a blanking operation on the tube which is welded in the tube welding unit 40 so as to manufacture insulation caps 1, and a cap discharge unit 60 for discharging the insulation caps 1 blanked in the cap blanking unit 50 from a blanking position.

The tube supply unit 20 houses rotatably a tube cassette 21 which winds a long tube 11 therein and feeds out the tube 11 in the tube cassette 21. Production instruction information (material, size, number of caps to be manufactured and the like) is indicated on the tube cassette 21 in the form of a bar code, etc. An information reading unit 22 for reading the production instruction information is provided in the tube supply unit 20. The information read by the information reading unit 22 is outputted to a control unit, not shown.

The tube feeding unit 30 has a rail table 31 which extends in the tube feeding direction 'a', a slider 32 which is provided on the rail table 31 so as to move freely in the tube feeding direction 'a' and the reverse direction 'b' to the tube feeding direction, the tube placing table 33 which is fixed to the slider 32, a step motor mechanism 34 for driving the slider 32 in forward and backward directions, and a pair of tube press fastening portions 35 which are disposed on the tube placing table 33. The step motor mechanism 34 is controlled by the control unit, not shown, with respect to moving direction and moving amount. The pair of tube press fastening portions 35 are raised and lowered by a cylinder 41, which will be described below, adapted to move together with the tube placing table 33 so as to be shifted between a press fastening position where to press fasten the tube 11 on the tube placing table 33 and a press fastening release position where to release the press fastening of the tube 11.

The tube welding unit 40 has a cylinder 41 which is fixed to the slider 32 so as to move together with the tube placing table 33, an ultrasonic welding portion 43 which is a welding main body portion which is fixed to the cylinder 41 via an arm portion 42, and a cooling blower device 45 for sending forcibly cooling air against a horn 43a of the ultrasonic welding portion 43.

The ultrasonic welding portion 43 is disposed between the pair of tube press fastening portions 35. The ultrasonic welding portion 43 and the pair of tube press fastening portions 35 are raised and lowered together with each other (in a direction indicated by an arrow 'c') relative to the tube placing table 33 by the cylinder 41. The cylinder 41 is controlled by the control unit, not shown, with respect to moving direction and moving amount. The cooling blower device 45 is also controlled by the controller, not shown.

The cooling blower device 45 has a plurality of hoses 45a for injecting air, and cooling air is injected at all times by these hoses 45a. The cooling blower device 45 is controlled by the controller, not shown.

A tube insertion guide 80 for inserting the tube into a tube guide 70 is disposed downstream of the cooling blower device 45 in the tube feeding direction 'a' on the tube placing table 33.

Figure 8:
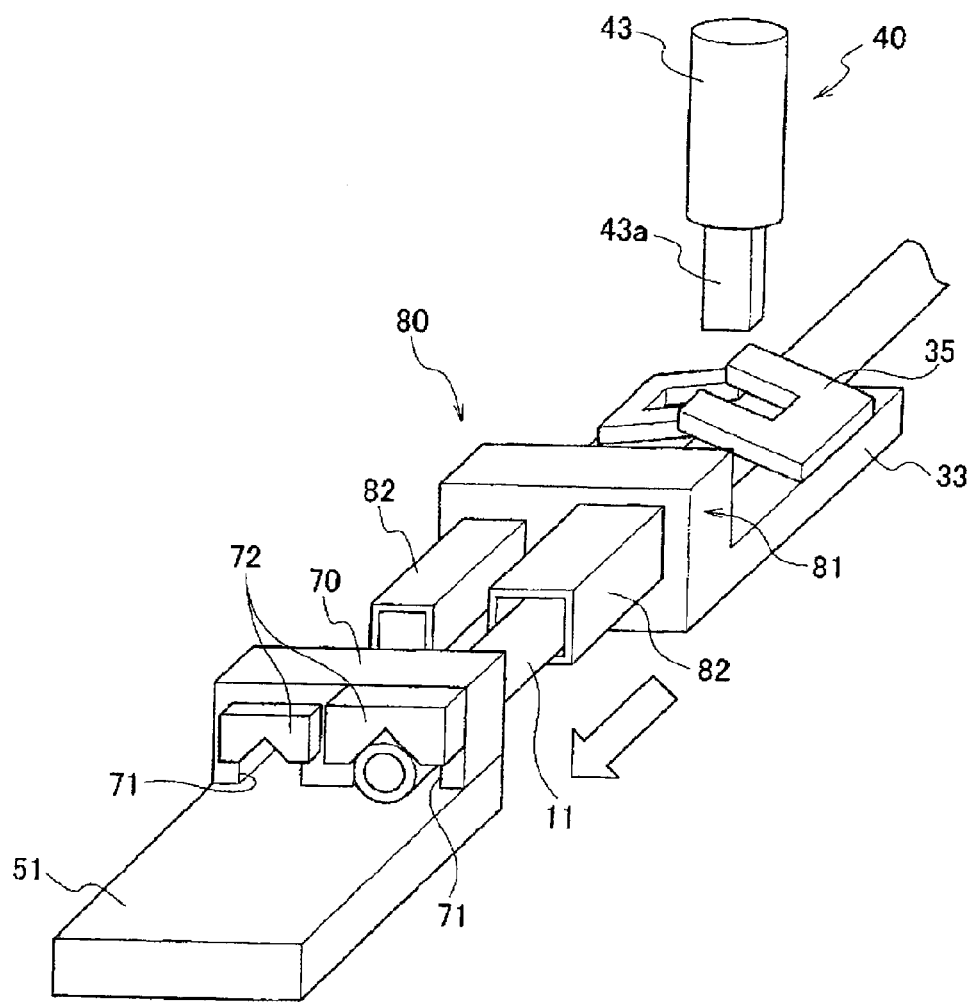
FIG. 8 is an enlarged perspective view showing a tube insertion guide and a tube guide portion which are in a state before the tube is inserted.
Figure 9:
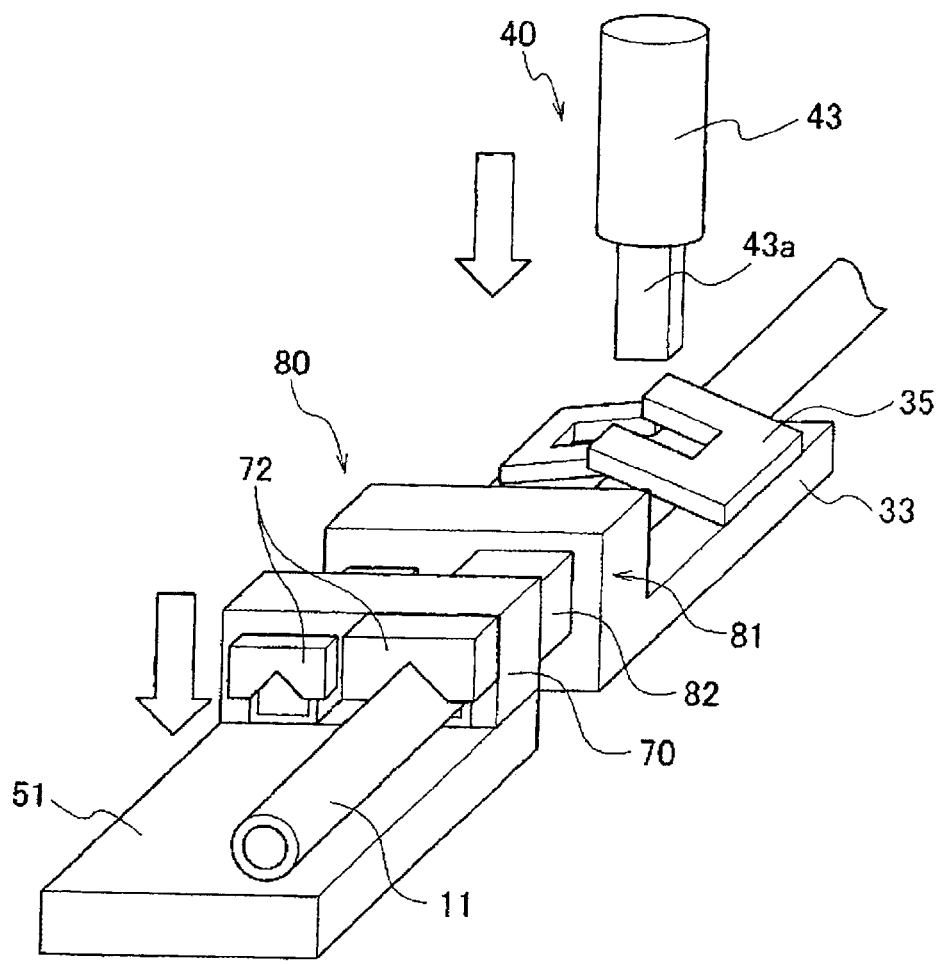
FIG. 9 is an enlarged perspective view showing the tube insertion guide and the tube guide unit which are in a state the tube is inserted.
Figure 10:
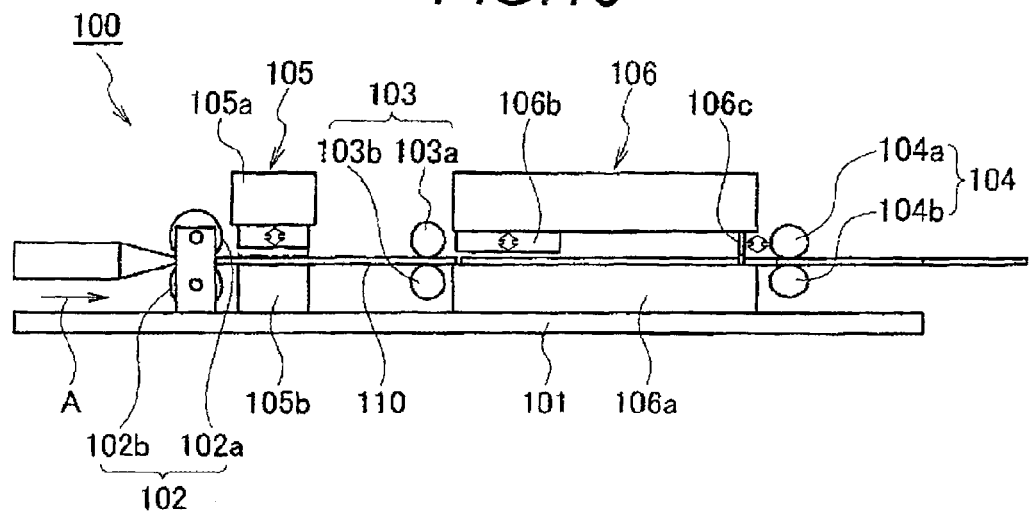
FIG. 10 is a schematic block diagram of an insulation cap manufacturing apparatus according to a related-art example.
Figure 11:
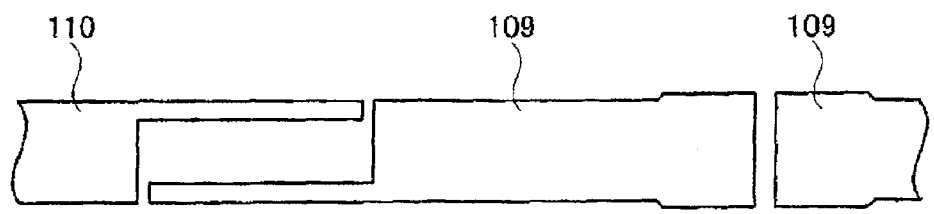
FIG. 11 is a plan view of an insulation cap manufactured by blanking.

As is shown in FIGS. 8, 9, the tube insertion guide 80 includes an erect portion 81 formed at an end portion of the tube placing table 33 so as to be erected therefrom and insertion portions 82 which project from one side surface of the erect portion 81 towards the tube guide portion 70 and into interiors of which tubes 11 are inserted.

Although in this embodiment, insertion portions 82 and insertion holes 71, which will be described later, are provided two for each, one or more than two insertion portions and insertion holes may be provided.

The cap blanking unit 50 has a lower receiving table 51 on which the tube 11 which is sent from the tube welding unit 40 by way of the tube guide portion 70 is disposed, an upper pressing base table 52, and a cylinder 53 for moving the upper pressing base table 52 in approaching and moving away directions 'd' relative to the lower receiving table 51. The upper pressing base table 52 has a blanking portion 52a and a cutting portion 52b. The blanking portion 52a and the cutting portion 52b are driven to move by the cylinder 53. The cylinder 53 is controlled by the control unit, not shown, with respect to moving direction and moving amount. By the upper pressing base table 52 being shifted to a position where the upper pressing base table 52 is brought into press contact with the lower receiving table 51, two insulation caps 1 are blanked from the long tube 11. Namely, the blanking of the insulation caps 1 out of the tube 11 by the blanking portion 52a and the cutting of the long tube 11 by the cutting portion 52b are performed concurrently. Specifically, the blanking portion 52a blanks part of the long tube 11 to form two tongue piece portions 4 where two insulation caps 1 face each other. The cutting portion 51b cuts the long tube 11 at an intermediate position of a sealed portion 3 which extends between two adjacent insulation caps 1.

The cap discharge unit 60 has a hose 60a fixed to the tube guide portion 70, and air is driven towards the insulation caps 1 so blanked and the like from a distal end of the hose 60a, so as to discharge the insulation caps 1 and the like from the blanking position.

The tube guide portion 70 is provided at the end portion of the lower receiving table 51 so as to be erected from the receiving table 51. The tube guide portion 70 has insertion holes 71 into which the insertion portions 82 which project from the tube insertion guide 80 are inserted, and tube press fastening members 72 are formed on upper sides of the insertion holes 71 for press fastening tubes 11 against the receiving table 51.

Reference numeral 5 in FIG. 2 denotes scraps left by blanking the insulation caps 1 out of the tube 11.

Next, the operation of the manufacturing apparatus 10 of insulation caps 1 will be described. Assuming that a long tube 11 is fed out of the tube supply unit 20 and is now placed on the tube placing table 33 and the pair of tube press fastening portions 35 and the ultrasonic welding portion 43 are now in the press fastening release position where the press fastening of the tube 11 by the former is released and a press contact release position where the press contact to the tube 11 by the latter is released, respectively.

From this state, as is shown in FIGS. 4A, 4B, the pair of tube press fastening portions 35 and the ultrasonic welding portion 43 are shifted to the press fastening position where to press fasten the tube 11 and a press contact position where to press contact the tube 11, respectively (a tube press fastening and press contacting step). Here, since the pair of tube press fastening portions 35 and the ultrasonic welding portion 43 are lowered towards the tube placing table 33 together with each other, both the pair of tube press fastening portions 35 and the ultrasonic welding portion 43 are shifted to the positions where the tube 11 is press fastened and press contacted with predetermined press fastening and press contacting forces. Namely, whether a tube 11A of a large size shown in FIG. 3A whose height in a press fastened state is T1 or a tube 11B of a small size shown in FIG. 3B whose height in a press fastened state is T2 (T2<T1) is used, the pair of tube press fastening portions 35 certainly press fasten the tubes 11A, 11B, and the ultrasonic welding portion 43 is allowed to be certainly brought into press contact with the tubes 11A, 11B.

Figure 3A:
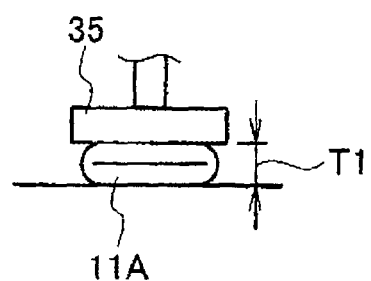
Figure 3B:
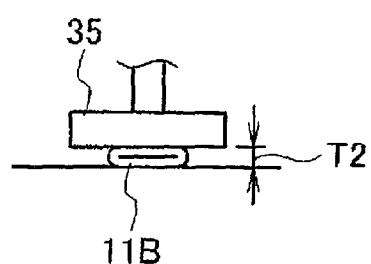
Figure 5A:
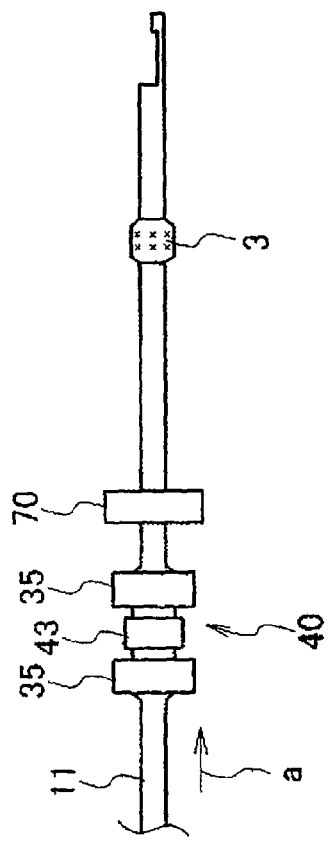
Figure 5B:
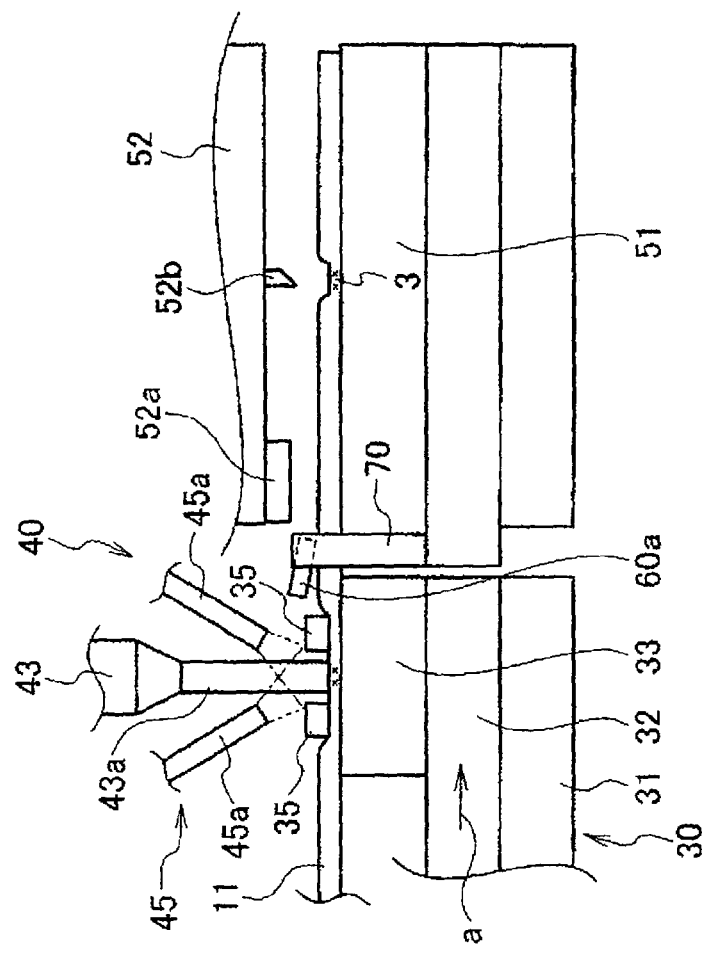

In FIGS. 3A, 3B, for clear understanding, alphanumeric reference number 11A is given to the large-sized tube, and alphanumeric reference number 11 B is given to the small-sized tube.

Next, a welding operation is performed on the tube 11 by the ultrasonic welding portion 43 (a tube welding step). Namely, ultrasonic waves are oscillated from the horn 43a of the ultrasonic welding portion 43 for a predetermined time. In this embodiment, the tube welding step includes ultrasonic wave oscillation and holding (cooling).

In the tube welding step, when the ultrasonic wave oscillation is completed to proceed with holding (cooling), the tube placing table 33 is fed out in the tube feeding direction 'a' by a specified amount. Then, since the tube 11 is fixed in place on the tube placing table 33 by the pair of tube press fastening portions 35 and is inserted into the tube insertion guide 80, the tube 11 is fed out in the tube feeding direction 'a' by the specified amount (a tube feeding step). By this tube feeding step, the tube placing table 33, etc. are shifted from positions indicated by solid lines in FIG. 2 (positions in FIGS. 4A, 4B) to positions indicated by imaginary lines in FIG. 2 (positions in FIGS. 5A, 5B). Namely, the tube welding step and the tube feeding step are partially performed concurrently. Since the state in which the tube 11 is press contacted by the horn 43a is also held while holding (cooling), welding can be stabilized.

The tube 11 which is fed out in the tube feeding direction by the specified amount is fixedly positioned by the tube press fastening member 72 between the receiving table 51 and the tube press fastening member 72.

Figures 6A, 6B:
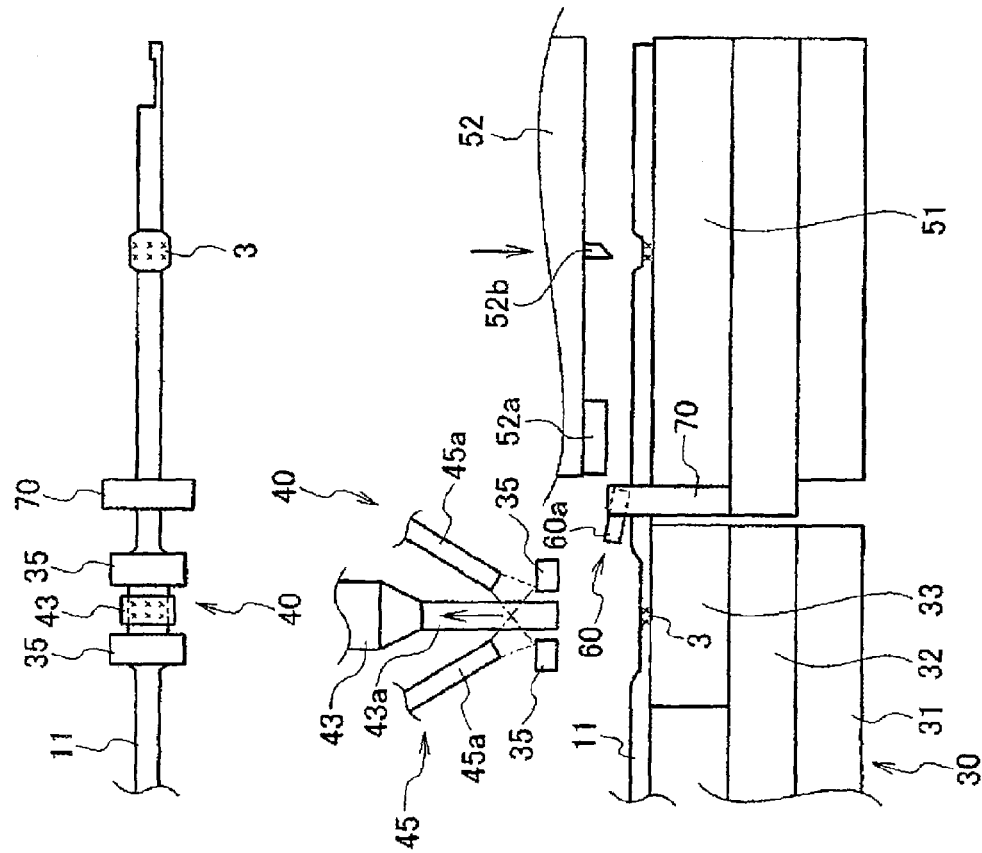

After the tube feeding step, as is shown in. FIGS. 6A, 6B, the pair of tube press fastening portions 35 and the ultrasonic welding portion 43 are shifted to the press fastening release position where the press fastening of the tube 11 is released and the press contact release position where the press contact to the tube 11 is released, respectively. Thereafter, the tube placing table 33 is caused to move in the reverse direction 'b' to the tube feeding direction (a tube placing table returning step). Then, since the tube 11 is not press fastened by the pair of tube press fastening portions 35 and is held in the current position with the help partly of a reverse feeding preventing function of the tube guide portion 70, only the tube placing table 33 is returned.

During the tube placing table returning step, as is shown in FIGS. 6A, 6B, the blanking portion 52a and the cutting portion 52b of the upper pressing base table 52 are lowered on to the lower receiving table 51 to blank insulation caps 1 out of the tube 11 and cut the tube 11. Thereafter, as is shown in FIGS. 7A, 7B, the blanking portion 52a and the cutting portion 52b of the upper pressing base table 52 are raised from the lower receiving table 51 (a cap blanking step). By this operation, two insulation caps 1 having a predetermined shape are manufactured by blanking them out of the tube 11.

Next, air is driven to the insulation caps and the like which are blanked out of the tube 11 by the hose 60a of the cap discharge unit 60 so as to discharge them from the blanking position. By repeating the series of steps and operations that are described heretofore continuously, insulation caps 1 can be manufactured in a continuous fashion.

When a new tube cassette 21 is installed in the tube supply unit 20, production instruction information indicated on the tube cassette 21 is read by the information reading unit 22. Then, the control unit (not shown) will change the feeding amount and the like for a tube 11 in the new tube cassette 21.

As has been described heretofore, the manufacturing apparatus 10 of the insulation cap includes the tube feeding unit 30 and the tube welding unit 40. The tube feeding unit 30 has the tube placing table 33 on which the tube 11 fed out of the tube supply unit 20 is placed and which can move in the tube feeding direction 'a' and the reverse direction 'b' to the tube feeding direction and the tube press fastening portions 35 which can move together with the tube placing table 33 and can be shifted between the press fastening position where to press fasten the tube 11 on the tube placing table 33 and the press fastening release position where to unfasten the tube 11. The tube welding unit 40 has the welding main body portion 43 which can move together with the tube placing table 33 and can be shifted between the press contact position where to press contact the tube 11 on the tube placing table 33 and the press contact release position where to release the press contact to the tube 11 while moving together with the tube press fastening portions 35, whereby the welding operation is performed on the tube 11 on the tube placing table 33 by the tube welding main body portion 43. Consequently, the tube press fastening portions 35 of the tube feeding unit 30 and the ultrasonic welding portion 43 move together in the directions 'c' in which the tube 11 on the tube placing table 33 is press fastened by the former and is press contacted by the latter and in which the press fastening by the former and the press contact by the latter of the tube 11 are released, and hence, since the tube press fastening portions 35 and the ultrasonic welding portion 43 are shifted tighter to the positions where to press fasten and press contact a tube of any size, preparation work becomes unnecessary which would otherwise be required in association with a change in tube size. In addition, since the tube feeding work can be carried out while the tube welding work is being carried out, the time consuming tube welding step and tube feeding step can be carried out concurrently as much as possible. Further, by the tube insertion guide 80 being disposed, the bending of the tube 11 can be prevented which would otherwise occur while the tube 11 is being transported. Thus, a reduction in working time can be realized.

In this embodiment, the tube supply unit 20 houses rotatably the tube cassette 21 which winds the long tube 11 therein and allows the tube 11 in the tube cassette 21 to be fed out thereof and has the information reading unit 22 which reads the production instruction information indicated on the tube cassette 21. Consequently, in the event that the automatic setup switching is made possible to be implemented based on the projection instruction information in the manufacturing apparatus 10 of insulation caps 1, the preparation time can be reduced.

In this embodiment, the cap discharge unit 60 drives air to the insulation caps 1 blanked out of the tube 11 in the cap blanking unit 50 so as to discharge them from the blanking position. Consequently, since when insulation caps and the like are manufactured by blanking, the insulation caps and the like are discharged from the blanking position by the air so driven, the automation of manufacturing work and reduction in working time can be realized.

In this embodiment, the tube welding unit includes the ultrasonic welding portion 43 and has the cooling blower device 45 for driving cooling air against the ultrasonic welding portion 43. Consequently, since the ultrasonic welding portion 43 is cooled by the air from the blower device 45 at all times, the welding stability can be increased.

MODIFIED EXAMPLE

While in the embodiment, the welding main body portion of the tube welding unit 40 includes the ultrasonic welding portion 43, any welding devices can be adopted provided that they can form a sealed portion 3 in the tube 11, and welding devices employing ultrasonic welding, high-frequency welding, and thermal welding may be included.

In the embodiment, pressure sensors may be provided on tube pressing surface sides of the pair of tube press fastening portions 35 and the horn 43a of the ultrasonic welding portion 43. By adopting this configuration, since the press fastening force and the press contacting force can be checked at which the pair of tube press fastening portions 35 and the horn 43a of the ultrasonic welding portion 43 press fasten and press contacts the tube 11, respectively, the pair of press fastening portions 35 and the horn 43a of the ultrasonic welding portion 43 are preferably allowed to press fasten and press contact the tube 11 at the predetermined press fastening force and press contacting force, respectively.

The invention claimed is:

1. A manufacturing method of an insulation cap, comprising:
   a supplying step of supplying an elongated tube from a tube supplying unit to a tube placing table;
   a press-fastening and press-contacting step of moving a tube press-fastening portion and a welding body portion towards the tube placing table so as to press-fasten a press-fastening position of the tube placed on the tube placing table and to press-contact a press-contacting position of the tube placed on the tube placing table;
   a welding step of performing a welding process with respect to the press-contacting position of the tube;
   a feeding step of moving the tube placing table during the welding step to feed the tube in a tube feeding direction by a specified amount;
   a blanking step of blanking the tube subjected to the welding process after the feeding step to form the insulation cap; and
   a discharging step of discharging the formed insulation cap from a blanking position.

2. The manufacturing method according to claim 1, further comprising a reading step of reading production instruction information indicated on a tube cassette which is housed in the tube supplying unit and winds the tube therein.

3. The manufacturing method according to claim 1, wherein the insulation cap is discharged by air blow in the discharging step.

4. The manufacturing method according to claim 1, wherein the welding process is performed by an ultrasonic welding in the welding step, and cooling air blows against the welding body portion at all times.

5. The manufacturing method according to claim 1, wherein the tube placing table is provided with a tube insertion guide.

6. The manufacturing method according to claim 1, wherein a press fastening force and a press contacting force are checked by a pressure sensor in the press-fastening and press-contacting step.

7. A manufacturing apparatus of an insulation cap, comprising:
   a tube supply unit which supplies an elongated tube;
   a tube placing table for placing thereon the tube supplied from the tube supply unit;
   a tube press-fastening portion which moves together with the tube placing table in a tube feeding direction and moves towards the tube placing table so as to press-fasten a press-fastening position of the tube placed on the tube placing table;
   a welding body portion which moves together with the tube press-fastening portion towards the tube placing table so as to press-contact a press-contacting position of the tube placed on the tube placing table and to perform a welding process with respect to the press-contacting position of the tube;
   a tube feeding unit which moves the tube placing table during the welding process to feed the tube in the tube feeding direction by a specified amount; and
   a cap blanking unit which blanks the tube subjected to the welding process which is fed from the tube feeding unit to form the insulation cap and discharges the formed insulation cap.

8. The manufacturing apparatus according to claim 7, further comprising:
   a tube cassette which is housed in the tube supplying unit and winds the tube therein; and
   a reading unit which reads production instruction information indicated on the tube cassette.

9. The manufacturing apparatus according to claim 7, wherein the cap blanking unit includes a cap discharge unit which discharges the insulation cap by air blow.

10. The manufacturing apparatus according to claim 7, wherein the welding body portion is an ultrasonic welding portion for performing an ultrasonic welding process with respect to the press-contacting position of the tube, and
   wherein the manufacturing apparatus has a cooling air blow device which blows cooling air against the ultrasonic welding portion at all times.

11. The manufacturing apparatus according to claim 7, wherein the tube placing table is provided with a tube insertion guide.

12. The manufacturing apparatus according to claim 7, wherein a pressure sensor is provided in each of the tube press-fastening portion and the welding body portion to check a press fastening force and a press contacting force.

* * * * *